(12) United States Patent
Hsu (10) Patent No.: US 9,594,590 B2
(45) Date of Patent: Mar. 14, 2017

(54) APPLICATION MIGRATION WITH DYNAMIC OPERATING SYSTEM CONTAINERS (75) Inventor: Wan-Yen Hsu, Cupertino, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 225 days.

(21) Appl. No.: 14/126,145

(22) PCT Filed: Jun. 29, 2011

(86) PCT No.: PCT/US2011/042284
§ 371 (c)(1),
(2), (4) Date: Dec. 13, 2013

(87) PCT Pub. No.: WO2013/002777
PCT Pub. Date: Jan. 3, 2013

(65) Prior Publication Data
US 2014/0137125 A1    May 15, 2014

(51) Int. Cl.
*G06F 9/455* (2006.01)
*G06F 9/46* (2006.01)
*G06F 15/16* (2006.01)
*G06F 15/177* (2006.01)
*G06F 3/00* (2006.01)
*G06F 9/48* (2006.01)

(52) U.S. Cl.
CPC ........ *G06F 9/4856* (2013.01); *G06F 9/45504* (2013.01)

(58) Field of Classification Search
None
See application file for complete search history.

(56) References Cited

U.S. PATENT DOCUMENTS 7,814,491 B1    10/2010  Chen et al.
8,713,566 B2 *   4/2014  Kashyap ................. G06F 8/61
                                                     718/1

(Continued)

FOREIGN PATENT DOCUMENTS

CN       1947096 A       4/2007
CN     101655798 A       2/2010

OTHER PUBLICATIONS

Osman et al; The Design and Implementation of Zap: A system for Migrating Computing Environments; OSDI '03: Proceedings of the 5th Symposium on Operating Systems Design and Implementation pp. 361-376, winter 2002.*

(Continued)

*Primary Examiner* — Bing Zhao
(74) *Attorney, Agent, or Firm* — Fabian VanCott (57) ABSTRACT Methods and systems of migrating applications (105-1 to 105-3) with dynamic operating system containers (205-1, 205-2) are disclosed, in which a number of applications (105-1 to 105-3) currently executed within a first operating system environment are identified for migration to a second operating system environment; a new operating system container (205-1, 205-2) is created within the first operating system environment; the number of identified applications (105-1 to 105-3) are transferred into the operating system container (205-1, 205-2); and the operating system container (205-1, 205-2) is migrated to the second operating system environment.

12 Claims, 7 Drawing Sheets

(56) References Cited

U.S. PATENT DOCUMENTS

| | | | |
|---|---|---|---|
| 2005/0060722 A1 | 3/2005 | Rochette et al. | |
| 2006/0259606 A1 | 11/2006 | Rogers et al. | |
| 2008/0301676 A1* | 12/2008 | Alpern | G06F 8/65 718/1 |
| 2009/0132804 A1 | 5/2009 | Prabir et al. | |
| 2010/0205252 A1 | 8/2010 | Dorai et al. | |
| 2010/0318608 A1 | 12/2010 | Huang et al. | |
| 2011/0154333 A1 | 6/2011 | Miyamoto et al. | |
| 2013/0212281 A1* | 8/2013 | Melander | G06F 9/45533 709/226 |

OTHER PUBLICATIONS

BrianEh; Migrating a XenDesktop environment from VMware to XenServer; Sep. 28, 2010.*

Oracle; How to move an Oracle® Solaris Container; An Oracle White Paper, May 2010.*

Mirkin et al; Containers Checkpointing and live migration, Proceedings of the Linux Symposium vol. Two pp. 85-90; Jul. 23-26, 2008.*

Cedric Le Goater, et al; Making Applications Mobile Under Linux; IBM France; nclab.kaist.ac.kr/~bjkim/OLS2006-MCR.pdf; Copyright 2006 IBM.

Romero, F. et al Live Migration of Parallel Applications with Open VZ, IN: 2 011 IEEE Workshops of International Conference on Advanced informal Ion Networking and Applications (WAINA), Mar. 22-25, 2011, pp. 526-531 (Romero, F. et al) See Abstract, chapter II-chapter II B.

International Searching Authority, the International Search Report and the Written Opinion, PCT/US20111042284, Feb. 24, 2012, 9 Pgs.

Yu Ping et al.; Mobile Agent Based Application Follow-Me Mobility in Pervasive Computing; Application Research of Computers vol. 25, No. 4 2008/04/15, 6 Pgs.

* cited by examiner

APPLICATION MIGRATION WITH DYNAMIC OPERATING SYSTEM CONTAINERS

BACKGROUND

The demand for continuous availability of certain computer programs continues to increase. High up-time is often desirable, for example, in web services which clients expect to be able to access at all times. As the field of web services grows, many organizations place a high-priority on ensuring that their web services are continuously running and constantly available. For example, an organization may rely heavily on mission-critical enterprise applications, such as database applications and other service applications, to effectively perform the objectives of that organization. As such, the organization may wish to reduce or eliminate the downtime of these applications. Another example in which high availability may be desirable is that of an application that uses large amounts of continuous processing time to perform complex calculations.

However, challenges exist in maintaining the continuous operation of a computer program. For example, computer programs generally execute within an operating system environment which may undergo regular maintenance. Certain types of operating system maintenance, such as patching operations, are performed while the operating system is off-line, which typically involves the interruption of computer programs running within the operating system environment. Additionally, a computing system executing the operating system environment and the computer program may need maintenance such that the hardware of the computer system is powered down during the maintenance. In still other examples, the processing resources of the computing system executing the computer program may become overburdened, thereby threatening the ability of the computing system to continuously execute the computer program.

BRIEF DESCRIPTION OF THE DRAWINGS

The accompanying drawings illustrate various examples of the principles described herein and are a part of the specification. The illustrated examples are merely examples and do not limit the scope of the disclosure.

Throughout the drawings, identical reference numbers may designate similar, but not necessarily identical, elements.

DETAILED DESCRIPTION

As described above, it may be desirable under some circumstances to continuously execute a computer program for an extended period of time. However, during the course of executing the computer program, it may become advisable to take the operating system environment and/or hardware platform of a computing device offline to perform maintenance. Additionally, the processing resources of the computing system executing the computer program may become overburdened, thereby threatening the ability of the computing system to continuously execute the computer program.

In light of these and other considerations, the present specification discloses methods and systems of using dynamically created operating system containers to migrate running applications from a first operating system environment to at least one other operating system environment, thereby allowing the first operating system environment or its underlying hardware platform to undergo maintenance without disrupting the execution of the applications. Additionally or alternatively, the methods and systems of the present specification may be used to free up processing resources on the first operating system environment.

In one illustrative method of migrating applications, a number of applications currently executed within a first operating system environment are identified for migration to a second operating system environment. A new operating system container is then created within the first operating system environment, and the number of identified applications are transferred into the operating system container. The operating system container may then be migrated to the second operating system environment.

In another illustrative method of migrating applications, an instruction from a user is received in a first operating system environment to create at least a first operating system container and a second operating system container. An assignment is also received of a first number of applications currently running within the first operating system environment to the first operating system container and of a second number of applications currently running within the first operating system environment to the second operating system container. The first number of applications is accordingly transferred to the first operating system container, and the second number of applications is transferred to the second operating system container. The first operating system container is then migrated to a second operating system environment, and the second operating system container is migrated to a third operating system environment.

An illustrative system of the present specification includes at least one processor and a memory communicatively coupled to the processor. The memory includes executable code which, when executed by the at least one processor, causes the at least one processor to: implement a first operating system environment; identify a number of applications currently executed within the first operating system environment for migration to a second operating system environment; create a new operating system container within the first operating system environment; transfer the number of identified applications into the operating system container; and migrate the operating system container to the second operating system environment.

These methods and systems provide substantial benefits. In contrast to a conventional operating system container where applications are launched inside the container, the methods and systems of the present specification disclose the creation of an operating system container that allows applications not launched from the container to move into the container when there is a reasons to move the applications to one or more other OS instances.

As used in the present specification and in the appended claims, the term "application" refers to a computer program other than an operating system kernel or a hardware driver.

As used in the present specification and in the appended claims, the term "operating system environment" refers to an instance of an operating system kernel and a set of conditions under which an application may be executed using the operating system kernel.

As used in the present specification and in the appended claims, the term "operating system container" refers to a virtual operating system having its own operating system name space, including process, file system, interprocess communication (IPC), hostname, and network space. An operating system container, as defined herein, is implemented within an operating system environment and logically isolated from other applications, processes, and operating system containers executed within that same operating system environment.

As used in the present specification and in the appended claims, the term "dynamic operating system container" refers to an operating system container that can be created on demand to contain applications that are already running at the time the operating system container is created.

As used in the present specification and in the appended claims, the term "kernel" or "operating system kernel" refers to the central component of a computer operating system that controls the execution of applications and access to hardware resources by applications.

As used in the present specification and in the appended claims, the term "driver" refers to an autonomous set of machine-readable instructions that provide an interface between an operating system kernel and a physical device communicatively coupled to a processor executing the operating system kernel.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

The principles disclosed herein will now be discussed with respect to illustrative systems and methods.

Figure 1:
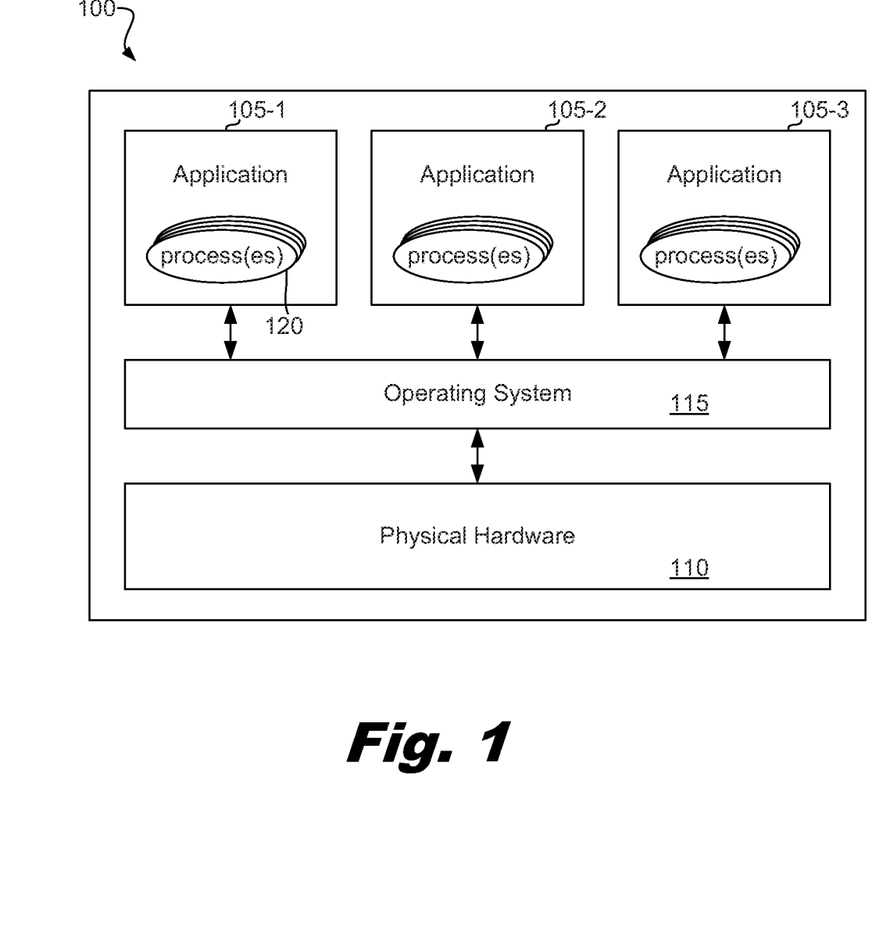
FIG. 1 is a block diagram of an illustrative computing system according to one example of the principles described herein.

FIG. 1 is a block diagram of an illustrative computing system (100) configured to implement an operating system environment in which various applications (105-1 to 105-3) are executed. The illustrative computing system (100) includes a platform of physical hardware (110). The physical hardware (110) may include, for example, at least one processor, computer memory, buses, local storage, and interfaces to external devices. In particular, the physical hardware (110) is configured to execute machine-readable instructions stored to implement certain elements of functionality.

One of the elements of functionality implemented by the physical hardware (110) is that of an operating system (115). The operating system includes a kernel, which coordinates the execution of applications (105-1 to 105-3) and access by the applications (105-1 to 105-3) to physical resources. Each of the applications (105-1 to 105-3) may be implemented as one or more distinct processes executed by the physical hardware (110), under the direction of the operating system (115).

In certain examples, the computing system (100) is a standalone computing system with dedicated physical hardware for the operating system (115). Alternatively, the computing system (100) may be a virtual machine with virtual physical hardware (110) implemented by a virtualization software executed by real physical hardware.

Figure 2:
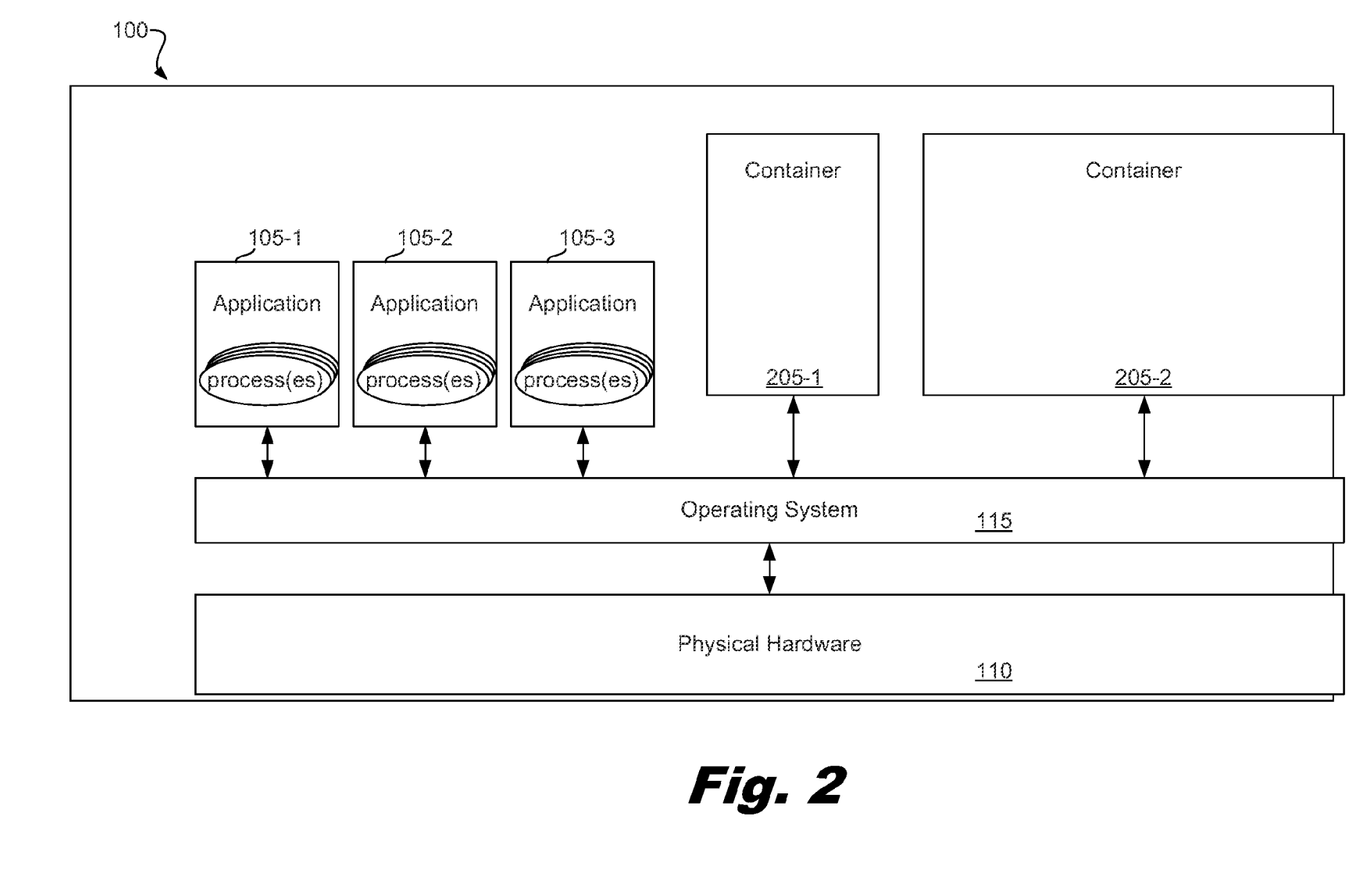
FIG. 2 is a block diagram of the creation of operating system containers in an operating system environment of an illustrative computing system according to one example of the principles described herein.

FIG. 2 is a block diagram of the computing system (100) of FIG. 1 with the addition of two new operating system containers (205-1, 205-2). As described above, it may be desirable to migrate the applications (105-1 to 105-3) to a new operating system environment for a number of reasons. For example, an administrator may wish to patch or update the operating system of the computing system (100), or processing resources of the computing system (100) may overloaded.

To allow for the seamless migration of the running applications (105-1 to 105-3) to a new computing system, the two operating system containers (205-1, 205-2) are created. The operating systems containers (205-1, 205-2) may be created under the direction of a user interacting with the computing system (100) through a user interface. Additionally or alternatively, the operating system containers (205-1, 205-2) may be created automatically in response to a trigger, such as an overload condition or a maintenance process. Each of the operating system containers (205-1, 205-2) virtualizes an isolated, autonomous operating system with its own process, file system, IPC, hostname, and network space. However, the operating system containers (205-1, 205-2) do not execute separate instances of the operating system kernel. By contrast, the functionality of the operating system containers (205-1, 205-2) is implemented by the already existing operating system (115) and drivers of the computing system (100).

Each of the applications (105-1 to 105-3) may be assigned to one of the created containers (205-1, 205-2). The assignment of the applications (105-1 to 105-3) to the operating system containers (205-1, 205-2) may be based on input from a user of the computing system through a user interface.

Additionally or alternatively, the assignment of the applications (105-1 to 105-3) may be determined automatically by the operating system (115) based on heuristics and/or rules. For example, the operating system (115) may determine the amount of processing resources utilized by each of the running applications (105-1 to 105-3), determine the amount of available processing resources in external computing systems, and compartmentalize the applications (105-1 to 105-3) into the operating system containers (205-1 to 205-3) by matching applications (105-1 to 105-3) and operating system containers (205-1, 205-2) to the external computing systems.

As shown in FIG. 2, the operating system (115) may in some examples execute the applications (105-1 to 105-3) separately from, and alongside the created containers (205-1, 205-2). Once the applications (105-1 to 105-3) have been assigned to their respective operating system containers (205-1, 205-2), the operating system (115) may transfer the applications (105-1 to 105-3) to their respective operating system containers (205-1, 205-2).

Figure 3:
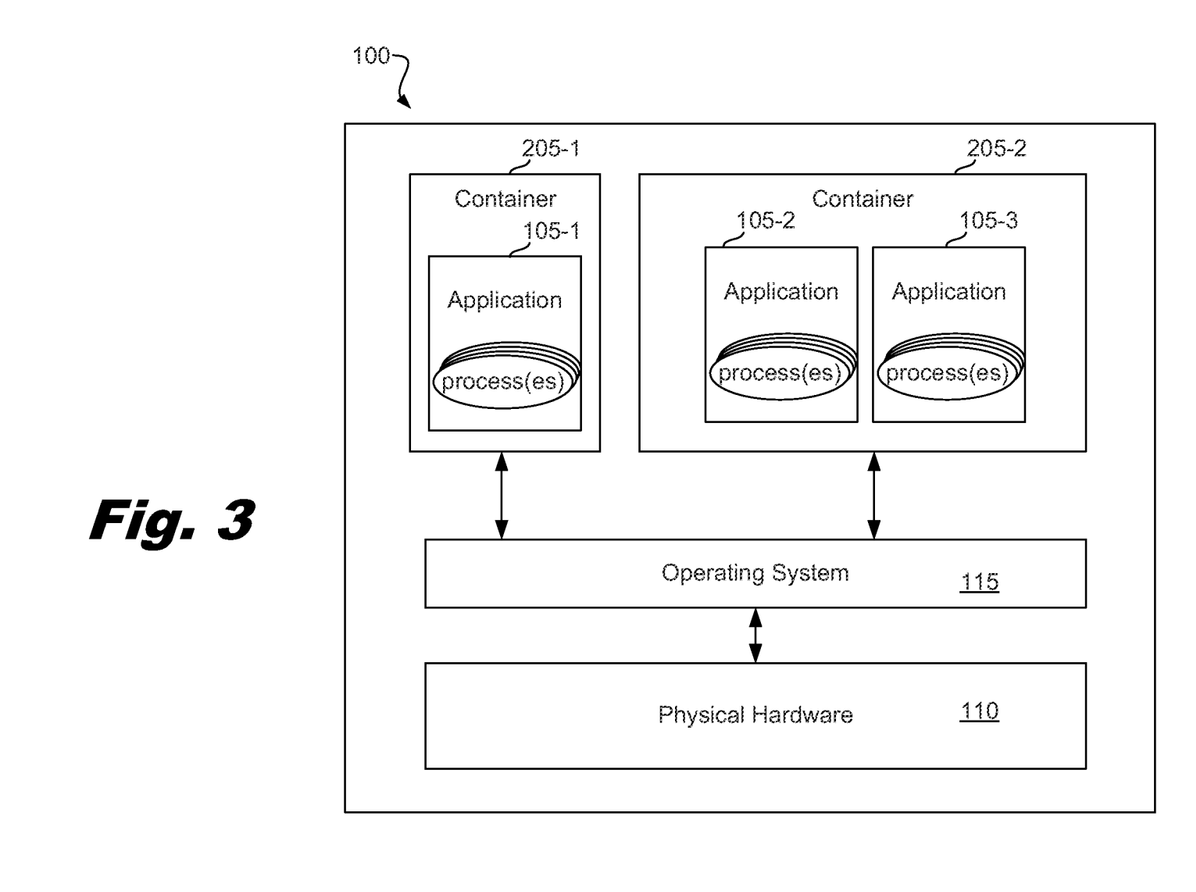
FIG. 3 is a block diagram of the transfer of applications to operating system containers in an operating system environment of an illustrative computing system according to one example of the principles described herein.

FIG. 3 is a block diagram of the illustrative computing system (100) of FIGS. 1 and 2 after the applications (105-1 to 105-3) have been transferred to their respectively assigned operating system containers (205-1, 205-2). As shown in FIG. 3, one application (105-1) has been transferred to the first operating system container (205-1), and two applications (105-2, 105-3) have been transferred to the second operating system container (205-2). The operating system (115) may be configured to adapt the running applications (105-1 to 105-3) for containerization prior to transferring them to their respective operating system containers (205-1, 205-2).

For example, the operating system (115) may retrieve a process data structure for each process of each of the applications (105-1 to 105-3) and update that process data structure to reflect that the process has been assigned to a specific container, that the container is of a certain type (i.e. dynamically created for migration of applications), and the identity of the container to which that process has been assigned.

The operating system kernel may be optimized to recognize processes running in containers based on these process data structures and afford special treatment to the containerized processes as may suit a particular implementation of the principles described herein.

Figure 4:
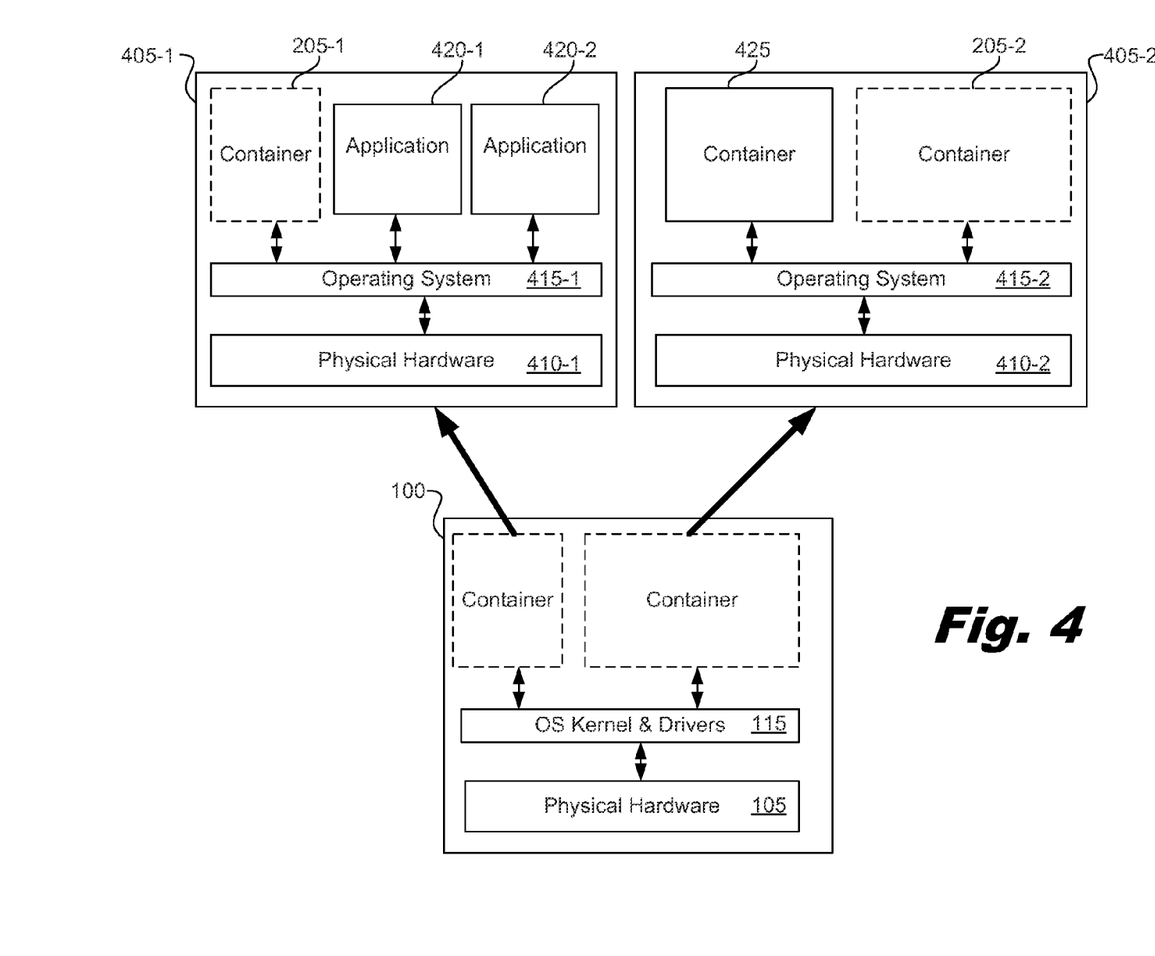
FIG. 4 is a block diagram of the migration of operating system containers from a first operating system environment to a second operating system environment and a third operating system environment, according to one example of the principles described herein.

FIG. 4 shows the migration of the first and second operating system containers (205-1, 205-2) of FIGS. 2-3 from their initial computing system (100) to a second computing system (405-1) and a third computing system (405-2), respectively. The second computing system (405-1) may implement a second operating system environment with a second set of hardware (410-1) executing a second operating system (415-1), and the third computing system (405-2) may implement a third operating system environment with a third set of hardware (410-2) executing a third operating system (415-2).

In certain examples, at least one of the second computing system (405-1) and the third computing system (405-2) may have been dynamically created as a destination for its respective operating system container (205-1, 205-2). For example, in response to a demand for computing resources to execute the applications of the second operating system container (205-2), a new physical or virtual computing platform may be instantiated as the third computing system (405-2) to receive the second operating system container (205-2).

One or both of the second and third computing systems (405-1, 405-2) may execute additional processes and/or containers besides the operating system containers (205-1, 205-2) migrated from the first computing environment (100). In the present example, the first operating system container (205-1) containing the first application (105-1) from the first computing system (100) has been migrated to the second computing system (405-1), which simultaneously executes two additional applications (420-1, 420-2) in parallel with the first operating system container (205-1). Also in the present example, the second operating system container (205-2) containing the second and third applications (105-2, 105-3) of the first computing system (100) has been migrated to the third computing system (405-2), which simultaneously executes an additional container (425).

Once the first and second containers (205-1, 205-2) of the first computing system (100) have been migrated to the second and third computing systems (405-1, 405-2), respectively, the first computing system (100) may be taken offline for servicing or take on additional workloads. From the perspective of a user or client of the applications (105-1 to 105-3) migrated from the first computing system (100), it will appear as if the applications (105-1 to 105-3) have been running continuously without any substantive change in functionality. The operating system containers (205-1, 205-2) provided a simulated operating system environment for the migrated applications (105-1 to 105-3) to run on the target computing systems (405-1, 405-2) as if they were running on the source computing system (100).

The first and second operating system containers (205-1, 205-2) described in the present specification are unique from other types of operating system containers used in the art. Other operating system containers are created prior to launching the applications contained in them, and the applications are launched from within the operating system containers.

By contrast, the operating system containers (205-1, 205-2) of the present specification can be created dynamically on an as-needed basis and running workloads that were initiated prior to the creation of the operating system containers (205-1, 205-2) may be transferred into the newly created operating system containers (205-1, 205-2). In this way, virtual machines or operating system containers need not be deployed beforehand and workloads need not be initially launched within a VM or a container to migrate the workloads to other operating system environments. These features conserve valuable processing resources and reduce the complexity of the operating system environments.

Additionally, the operating system containers (205-1, 205-2) of the present specification allow a user to create the operating system containers (205-1, 205-2) and assign running applications to the created containers (205-1, 205-2) based on input to the host computing system (100) through a user interface. This feature provides flexibility for administrative users to selectively migrate running applications to external operating system environments in order to perform maintenance on the host operating system environment or balance workloads among multiple computing systems (100, 405-1, 405-2).

This flexibility further enables users to create multiple operating system containers (205-1, 205-2) and assign running applications to the multiple containers, thereby allowing the user to evacuate the workload from a host computing system (100) to multiple target computing systems (405-1, 405-2). In this way, a full system load can be distributed among multiple operating system containers (205-1, 205-2), thereby balancing the workload from migrated applications among the available processing resources of the target computing systems (405-1, 405-2).

Yet another benefit provided by the operating system containers (205-1, 205-2) of the present specification is the ability to migrate evacuated applications back to the source computing system. For example, if the applications (105-1 to 105-3) were migrated to the target computing systems (405-1, 405-2) to perform maintenance on the source computing system (100), it may be desirable to return the applications (105-1 to 105-3) to the source computing system (100) once the maintenance has been performed and the source computing system (100) is back online. This may be done by simply migrating the containers (205-1, 205-2) back to the source computing system (100). The applications (105-1 to 105-3) may then be removed from or left in the containers (205-1, 205-2) for operations at the source computing system (100).

Figure 5:
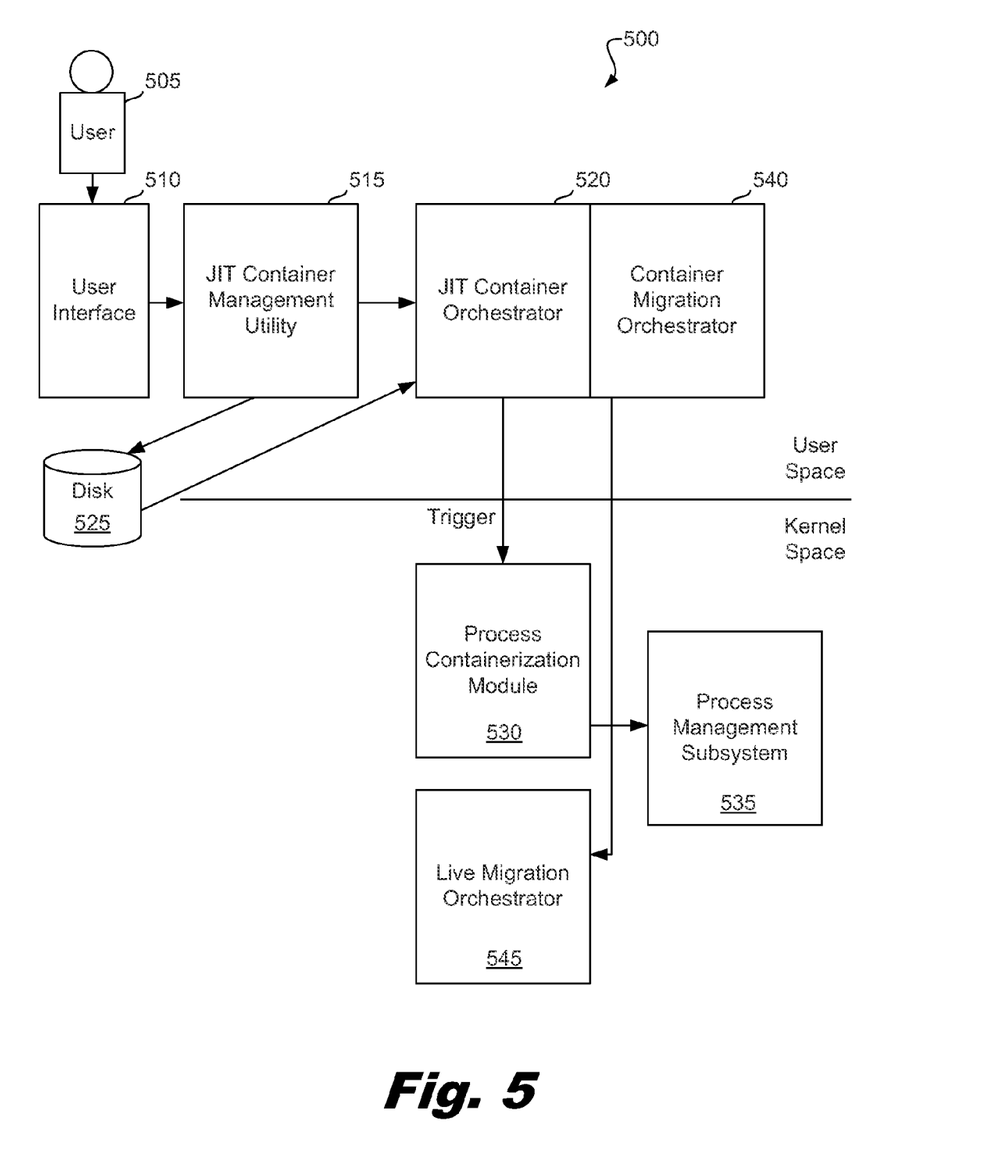
FIG. 5 is a block diagram of an illustrative architecture for application migration using operating system containers, according to one example of the principles described herein.

FIG. 5 is a block diagram of an illustrative architecture (500) of a system for migrating applications using operating system containers. The system architecture (500) may be implemented, for example, within a computing system (100) with running applications (105-1 to 105-3).

The system architecture (500) includes a user interface (510) that allows a user (505) to interact with a Just-In-Time (JIT) container management utility (515). For the purposes of the present example, an operating system container having the characteristics and features described with respect to the discussion of FIGS. 1-4 may be abbreviated as a JIT container.

An example of a sequential process for migrating applications to an external computing system using the system architecture (500) of FIG. 5 will now be given. The process begins with the user (505) issuing a command through the user interface (510) to the JIT container management utility (515) to create a new JIT operating system container. The command may include two parameters: a name for the JIT container and the identification of each of the running applications to be transferred into the new JIT container. If no applications are specified, the command will be treated as specifying by default all applications and processes running natively on the operating system of the host computing system.

Upon receiving the command from the user (505), the JIT container management utility (515) may validate the parameters and store configuration information for the new JIT container in a file on the disk (525). The JIT container management utility (515) may then send a request to the JIT container orchestrator (520) to create the JIT container. The JIT orchestrator (520) may then send a trigger to the process containerization module (530) of the operating system kernel, which begins the containerization process for each process of each application to be transferred to the JIT container in response to the trigger.

As part of the containerization process, the process containerization module (530) interacts with the process management subsystem (535) to retrieve a data structure corresponding to each process of each application to be transferred to the JIT container, marks the data structure as a JIT process by specifying in a field of the data structure that the process belongs to a JIT container, and enters the JIT container identifier into data structure. The JIT container identifier may be the name specified by the user (505) or another identifier.

The container migration orchestrator (540) may then interact with the live migration orchestrator (545) of the operating system kernel to migrate the JIT container to the external computing system specified by the user (505) or automatically selected using heuristic or rule-based computations.

Figure 6:
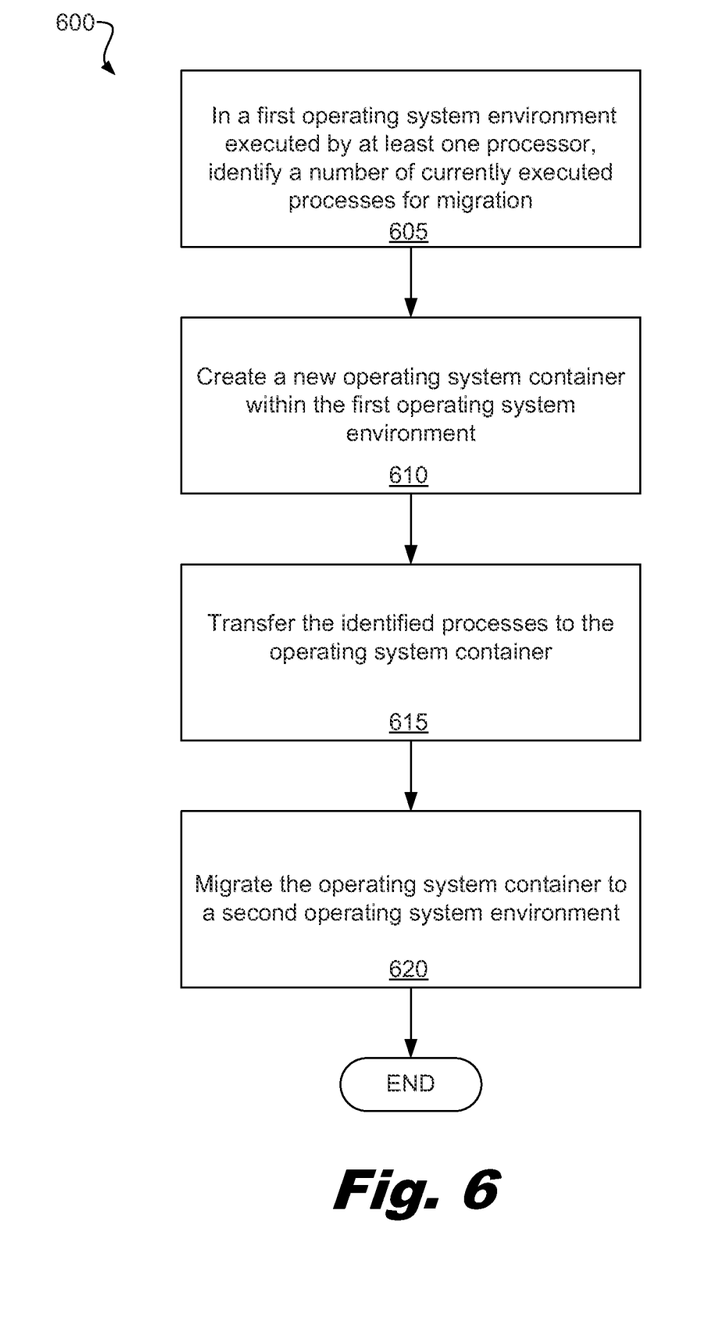
FIG. 6 is a flowchart diagram of an illustrative method of application migration using operating system containers, according to one example of the principles described herein.

FIG. 6 is a flowchart diagram of an illustrative method (600) of migrating at least one running application from a first operating system environment executed by at least one processor to a second operating system environment through the use of operating system containers. The method (600) may be performed, for example, by the computing system (100) of FIGS. 1-4. At least one of the first operating system and the second operating system may be implemented by, for example, a virtual machine implemented by a hypervisor executed by a physical machine.

The method (600) begins by identifying (block 605) processes that are currently being executed within the first operating system environment as candidates for migration. As described previously, the processes may be identified by a user and/or automatically. A new operating system container is then created (block 610) within the first operating system environment, and the identified applications are transferred (block 615) into the newly created operating system container.

In certain examples, the identified applications may be adapted for execution within the operating system container before being transferred into the operating system container. For example, a data structure corresponding to each process of each identified application may be updated as described above to adapt the identified applications for running within the operating system container. In certain examples, the identified applications may not have been executed within any operating system container prior to their transfer to the newly created operating system container. The identified applications may continuously run during their transfer to the operating system container.

The operating system container is then migrated (block 620) to the second operating system environment. The identified applications may continuously run prior to and after the migration of the operating system container to the second operating system environment to minimize or eliminate application down-time. In certain examples, a state of the identified applications may be saved prior to the migration of the operating system container and restored after the migration of the operating system container has been completed. Additionally or alternatively, the applications may execute continuously during the migration to the second operating system environment. In this way, execution continuity may be maintained for each of the identified applications prior to and after the migration of the operating system container to the second operating system environment.

In certain examples, following the migration of the operating system container to the second operating system environment, the first operating system container may be patched or otherwise undergo maintenance. Once the maintenance has been completed on the first operating system environment, the operating system container may be migrated back to the first operating system environment in response to a trigger from the first operating system environment. Upon returning to the first operating system environment, the applications in the operating system container may continue to run within the operating system container or be executed natively within the first operating system environment. In certain examples, a user may be presented with the option to choose whether to continue executing the applications within the operating system container or to execute the applications natively within the first operating system environment.

Figure 7:
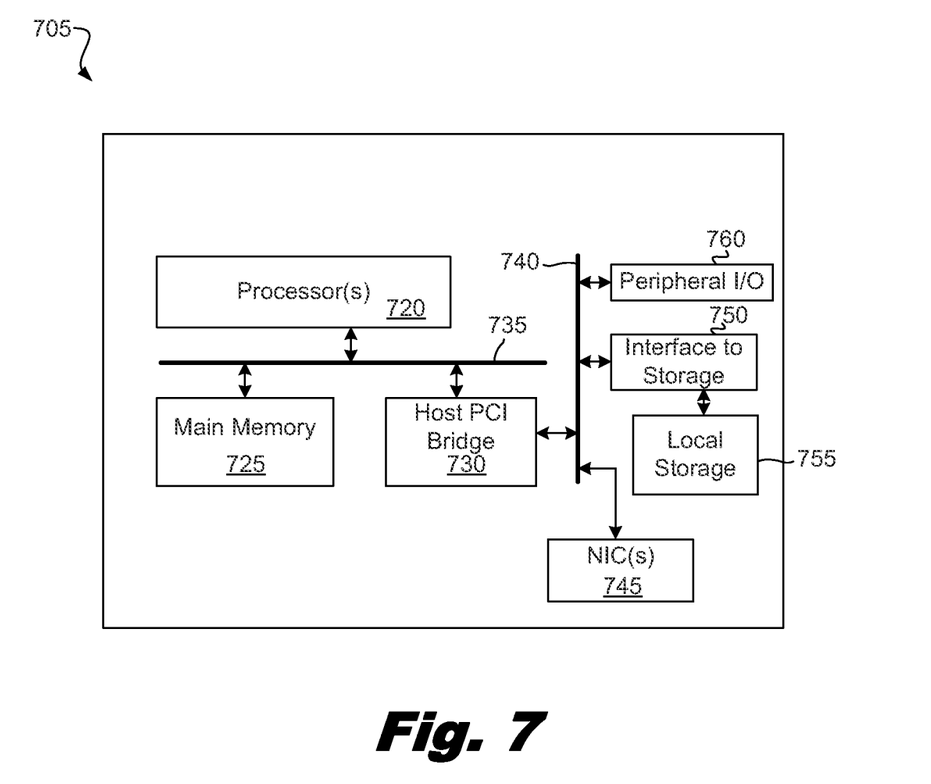
FIG. 7 is a block diagram of an illustrative computing environment, according to one example of the principles described herein.

FIG. 7 is a block diagram of an illustrative computing device (705) that may be used to implement any of the computing systems (100, 405-1, 405-2), system architectures (500), and/or methods (600, 700) of the previous Figures consistent with the principles described herein.

In this illustrative device (705), an underlying hardware platform executes machine-readable instructions to exhibit a desired functionality. For example, if the illustrative device (705) implements the computing system (100) of FIG. 1, the machine-readable instructions may include at least instructions for implementing a first operating system environment, identifying a number of applications currently executed within the first operating system environment for migration to a second operating system environment; creating a new operating system container within the first operating system environment; transferring the number of identified applications into the operating system container; and migrating the operating system container to the second operating system environment.

The hardware platform of the illustrative device (705) may include at least one processor (720) that executes code stored in the main memory (725). In certain examples, the processor (720) may include at least one multi-core processor having multiple independent central processing units (CPUs), with each CPU having its own L1 cache and all CPUs sharing a common bus interface and L2 cache. Additionally or alternatively, the processor (720) may include at least one single-core processor.

The at least one processor (720) may be communicatively coupled to the main memory (725) of the hardware platform and a host peripheral component interface bridge (PCI) (730) through a main bus (735). The main memory (725) may include dynamic non-volatile memory, such as random access memory (RAM). The main memory (725) may store executable code and data that are obtainable by the processor (720) through the main bus (735).

The host PCI bridge (730) may act as an interface between the main bus (735) and a peripheral bus (740) used to communicate with peripheral devices. Among these peripheral devices may be one or more network interface controllers (745) that communicate with one or more networks, an interface (750) for communicating with local storage devices (755), and other peripheral input/output device interfaces (760).

The configuration of the hardware platform of the device (705) in the present example is merely illustrative of one type of hardware platform that may be used in connection with the principles described in the present specification. Various modifications, additions, and deletions to the hardware platform may be made while still implementing the principles described in the present specification.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of migrating applications with dynamic operating system containers, said method comprising:
    in a first operating system environment implemented by at least one processor, identifying a number of applications currently executed within said first operating system environment for migration to a second operating system environment;
    creating a new operating system container within said first operating system environment;
    transferring said number of identified applications into said operating system container;
    migrating said operating system container to said second operating system environment such that execution continuity of each of the identified applications is maintained on the operating system container; and
    patching said first operating system environment while said number of identified applications is being executed within said operating system container on said second operating system environment.

2. The method of claim 1, further comprising adapting said number of identified applications for execution within said operating system container.

3. The method of claim 1, in which said number of identified applications are not executed within any operating system container prior to transferring said number of identified applications to said operating system container.

4. The method of claim 1, in which at least one of said first operating system environment and said second operating system environment is implemented within a virtual machine.

5. The method of claim 1, further comprising migrating said number of applications back to said first operating system environment in response to a trigger.

6. A method of migrating applications executed by a computing system, said method comprising:
    in a first operating system environment implemented by at least one processor, receiving an instruction from a user to create at least a first operating system container and a second operating system container;
    in said first operating system environment, receiving an assignment of a first number of applications currently running within said first operating system environment to said first operating system container and an assignment of a second number of applications currently running within said first operating system environment to said second operating system container, each of the assignment of the first number of applications and the assignment of the second number of applications being determined based on a heuristic or a rule;
    transferring said first number of applications to said first operating system container and said second number of applications to said second operating system container;
    migrating said first operating system container to a second operating system environment such that execution continuity of said first number of applications is maintained on the first operating system container and migrating said second operating system container to a third operating system environment such that execution continuity of said second number of applications is maintained on the second operating system container; and
    patching said first operating system environment while said first number of applications is being executed on said first operating system container on the second operating system environment and while said second number of applications is being executed on said second operating system container on the third operating system environment.

7. The method of claim 6, in which said second operating system environment and said third operating system environment are selected by said user.

8. The method of claim 6, further comprising assigning said first operating system container to said second operating system environment and said second operating system container to said third operating system environment based on a) an availability of processing resources in said second operating system environment and said third operating system environment and b) an amount of processing resources consumed by each application in said first number of applications and said second number of applications.

9. The method of claim 6, further comprising dynamically creating at least one of said second operating system environment and said third operating system environment as a destination for at least one of said first operating system container and said second operating system container.

10. A system, comprising:
    at least one processor;
    a memory communicatively coupled to said at least one processor, said memory comprising executable code that, when executed by said at least one processor, causes said at least one processor to:
    implement a first operating system environment;

identify a number of applications currently executed within said first operating system environment for migration to a second operating system environment;

create a new operating system container within said first operating system environment;

transfer said number of identified applications into said operating system container;

migrate said operating system container to said second operating system environment such that execution continuity of each of the identified applications is maintained on the operating system container; and patch said first operating system environment while said number of identified applications is being executed within said operating system container on said second operating system environment.

11. The system of claim 10, said executable code further causing said at least one processor to adapt said number of identified applications for execution within said operating system container.

12. The system of claim 10, said executable code further causing said at least one processor to migrate said number of applications back to said first operating system environment in response to a trigger.

* * * * *